United States Patent [19]

Andersson

[11] Patent Number: 4,793,470

[45] Date of Patent: Dec. 27, 1988

[54] CONVEYOR BELT CRADLE ASSEMBLY

[75] Inventor: Sven E. Andersson, Sandy, Utah

[73] Assignee: Baker International Corporation, Orange, Calif.

[21] Appl. No.: 885,215

[22] Filed: Jul. 14, 1986

[51] Int. Cl.[4] .............................................. B65G 15/08
[52] U.S. Cl. ...................................... 198/823; 198/841
[58] Field of Search ............... 198/823, 826, 841, 818, 198/861.1, 827

[56] References Cited

U.S. PATENT DOCUMENTS

| 1,530,499 | 3/1925 | Knobe | 198/826 X |
| 3,625,344 | 12/1971 | Debeaux | 198/823 X |
| 4,144,964 | 3/1979 | Valcalda | 198/827 X |

FOREIGN PATENT DOCUMENTS

| 0046425 | 2/1982 | European Pat. Off. | 198/823 |
| 0926658 | 3/1955 | Fed. Rep. of Germany | 198/826 |
| 0260569 | 1/1970 | U.S.S.R. | 198/823 |
| 0602423 | 4/1978 | U.S.S.R. | 198/823 |
| 0742286 | 6/1980 | U.S.S.R. | 198/823 |
| 0638681 | 6/1950 | United Kingdom | 198/823 |

OTHER PUBLICATIONS

Brochure of Spirit Corp. of West Jordan, Utah.
Blueprint of BNR Engineering Sales, Inc. of Hibbing, Minn.
Brochure of Martin Engineering Company of Neponset, Ill.
Brochure of "the JL Group" of England.
Brochure of Skega AB of Ersmark, Sweden Primary Examiner—Robert J. Spar
Assistant Examiner—D. Glenn Dayoan
Attorney, Agent, or Firm—Trask, Britt & Rossa

[57] ABSTRACT

A cradle assembly having longitudinal slats for supporting a conveyor belt, especially a troughed conveyor belt, in which the cradle may be folded or readily partially disassembled for easy original installation as for retrofitting into an existing conveyor belt system is disclosed.

6 Claims, 4 Drawing Sheets

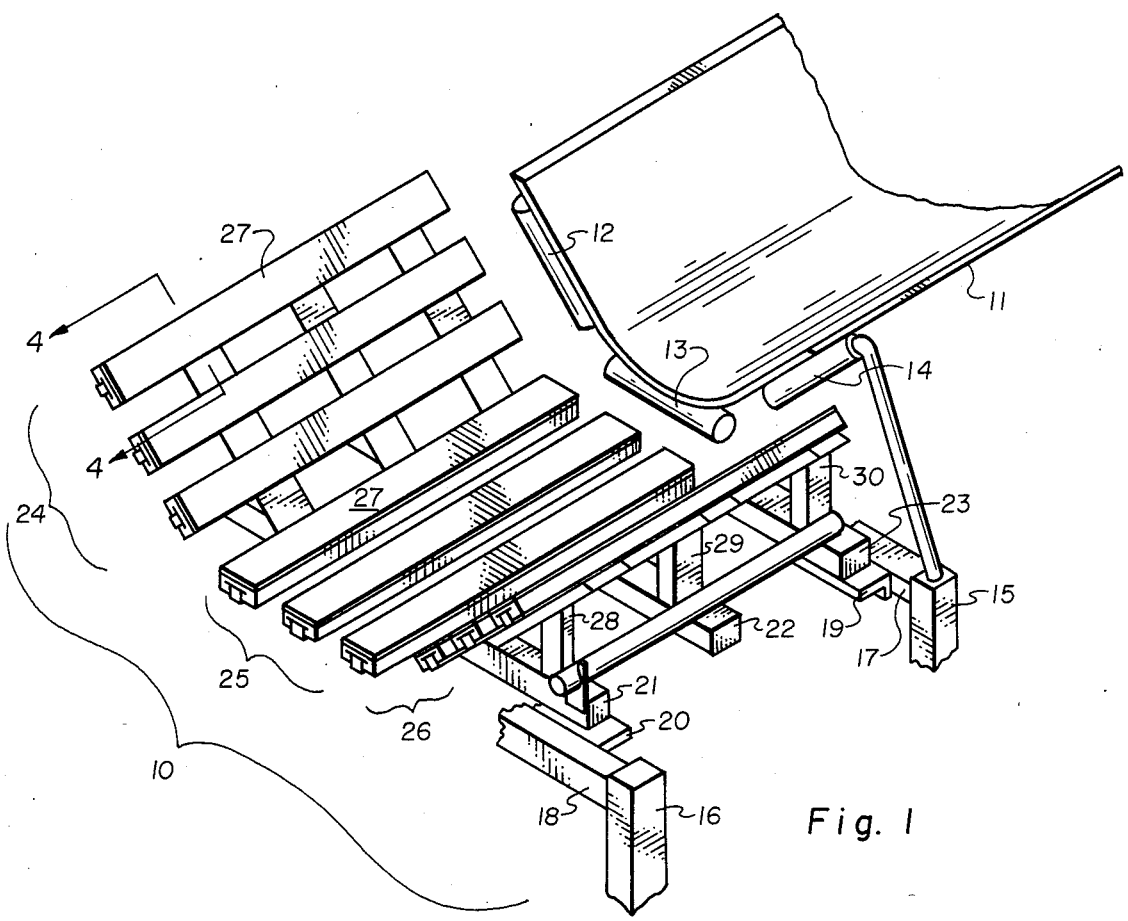
Fig. 1
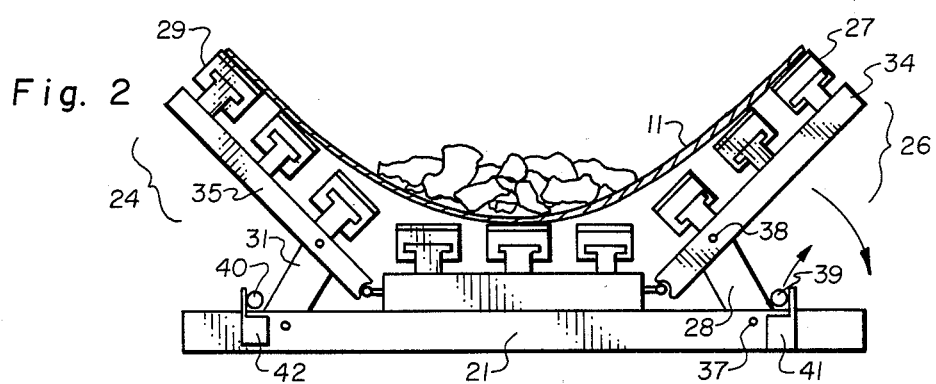
Fig. 2
Fig. 3

CONVEYOR BELT CRADLE ASSEMBLY

BACKGROUND OF THE INVENTION

1. Field

This invention relates generally to slat or bar-type support systems for conveyor belts especially for use under a loading zone of the conveyor belt and especially for "V" or "U"-shaped conveyor belts.

2. Prior Art

Existing slat or bar-type support assemblies are constructed in place, often times being constructed prior to the installation of the conveyor belt. With flat belts, the slat or bar support system may e readily installed after the belt is in place. However, with deep "V"-shaped belt conveyors the distance between the overhead loaded belt and the lower return belt is such that a preconstructed "V"-shaped slatted support assembly will not fit between the belts for installation. Thus, the practice has been to construct such "V"-shaped slatted support systems in place, or to remove the belt while the slatted support system is put in place. Also, once a preconstructed "V"-shaped slotted support assembly is in place, it is difficult to remove the bar-like or slat members since these usually are removed longitudinally inasmuch as a groove runs the length of a slat so that it may be slid over a "T"-shaped bolt to remove the slat. However, once the system is in place, idler rollers, which are usually adjacent to either end of the slotted support assembly, prevent the bars from being slid longitudinally. The bars have a wear surface, which are usually plastic, teflon or other hard smooth plastic coating over a rubber mid-section supported by a steel base. While the plastic surface is wear resistant, the bars need to be replaced periodically. When it is necessary to replace the bars, then the whole assembly must be again disassembled or the belt removed or the idler pulley which is on either end of the slatted support member must be removed.

SUMMARY OF THE INVENTION

A cradle assembly is disclosed herein having slatted or bar-type support members for supporting a conveyor belt in which two or more bars are constructed on a cross-member to form a cradle subassembly. At least one subassembly of at least two or more subassemblies present per cradle unit is readily detachable to permit a "V"-shaped cradle assembly to be installed to support a "V"-shaped belt after the belt has been installed. This cradle assembly is also useful in new installations prior to assembly and installation of the conveyor belt inasmuch as the cradle assembly, or at least a subassembly thereof, may be readily removed so that the bar-like support members may be replaced without removing the belt or removing idler pulleys.

The cradle assembly of this invention comprises at least two transverse beam members and at least two cradle subassemblies or bar-like members attached to the transverse beam members, either in a replaceable manner or with a hinge for each near the mid-point of the transverse beam members. A cradle subassembly comprises at least two cross-members to which elongated bar-like members are attached perpendicularly.

A typical cradle support system comprises two or more transverse main beam members with a central cradle subassembly containing two or more elongated bar-like support members attached perpendicularly to cross-member supports, wherein the cross-members are supported on or adjacent to, and substantially co-extensive with, a portion of the transverse beam members. This central subassembly has a generally flat overall upper surface such that it would support the bottom of a "U"-shaped or trough-shaped conveyor belt. On either side of the central cradle subassembly is another cradle subassembly which may be hinged on either side of the central subassembly with removable or hinged struts, whereby the outboard subassemblies may be inclined so that the outboard or wing cradle subassemblies then form a generally "U" or "V"-shaped trough in conjunction with the central cradle subassembly to support a troughed conveyor belt.

The cradle support assemblies of the instant invention for supporting conveyor belts, especially troughed conveyor belts, are particularly advantageous inasmuch as these assemblies may be retrofit into existing conveyor belt installations, and are adapted to be readily removed from conveyor belt installations without disassembly of the conveyor belts. These cradle assemblies are further adapted to fit into the small space existing between the load and return belts in most trough belt installations wherein very little vertical space exists between the top and bottom runs of the conveyor belt.

BRIEF DESCRIPTION OF THE DRAWINGS

Further description of the invention may be facilitated by reference to the attached drawings.

FIG. 1 is a perspective view of a "V" shaped cradle assembly with folding wing members having bar or slat-type longitudinal support members;

FIG. 2 is an elevational end view of the cradle assembly of FIG. 1 with both wing assemblies in an inclined position;

FIG. 3 is an elevational end view of the cradle assembly of FIG. 1 with one wing assembly in a folded position;

DETAILED DESCRIPTION OF THE PREFERRED EMBODIMENT

Figure 4:
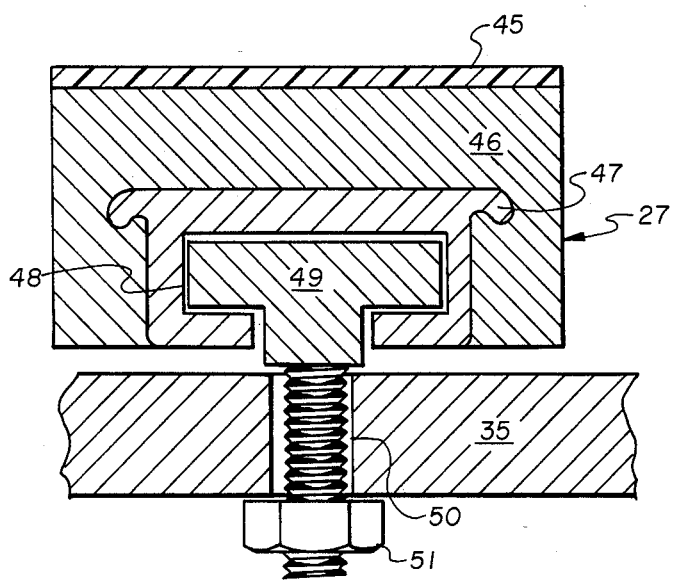
FIG. 4 is a detailed elevational end view of the attachment mean for attaching a bar support member to a cross-member of a cradle.

FIGS. 1, 2 and 3 are different views of the same cradle assembly for supporting troughed conveyor belts. FIG. 1 is a perspective view of the cradle assembly 10, while FIG. 2 is an end on elevational view of the cradle assembly of FIG. 1, and FIG. 3 is an end on view of the cradle assembly of FIG. 1 with one cradle subassembly, i.e., a wing assembly, in a disengaged position.

In FIG. 1, the cradle assembly 10 is illustrated with a partial view of a conveyor belt 11 and idler rollers 12, 13 and 14 which, when the cradle assembly is in position to support a troughed conveyor belt, are generally proximate to either end of the cradle assembly. Support posts 15 and 16 are members of the conveyor belt's main installation structure and are not part of the cradle assembly. These support posts 15 and 16 exist to support the idler rollers. These support posts, in conjunction with existing beams members 17 and 18 which tie these support posts together, may be used further to support the cradle assembly when it is placed in condition. In FIG. 1, a pair of angle iron members 19 and 20 are shown attached to the cross-beams 17 and 18 to provide support for the cradle assembly.

The cradle assembly 10 utilizes three transverse cradle support beams 21, 22 and 23. These cradle support beams 21, 22 and 23 have a length which is generally approximately the width of the conveyor belt which the cradle assembly supports. These cradle support beams, of course, may be longer than the width of the belt, if desired. Attached to said transverse cradle support beams 21, 22 and 23 are three cradle subassemblies 24, 25 and 26. These cradle subassemblies are very similar in structure with outboard subassemblies 24 and 26, also referred to as wing assemblies, being substantially identical except that one may be the mirror image of the other, although they may be constructed identically.

Attached to each cradle subassembly are slats or bar-like members 27, which cradle assembly illustrated in FIGS. 1, 2 and 3 are identical in character and dimensions. Outboard cradle subassemblies 24 and 26 are inclined with reference to the central subassembly 25 and are supported in such an inclined position by struts 28, 29 and 30 supporting cradle subassembly 26 while struts 31, 32 and 33 support cradle subassembly 24. These latter struts are not visible in FIG. 1, but strut 31 is illustrated in FIGS. 2 and 3.

In FIG. 2, the cradle assembly is illustrated with the outboard cradle subassemblies 24 and 26 in an inclined position supported by struts 28, 29, 30, 31, 32 and 33. These struts are hinged respectively to transverse cradle beam members 21 and to cross-members 34 by pin members such as pin members 37 and 38. These outboard cradle subassemblies 24 and 26 are locked into position by bars 39 and 40, which are held in place by stop or riser members 41 an 42 which have a vertical component rising above the upper surface of the beam member 21 so that the bars are held in place.

As illustrated in FIGS. 2 and 3, cradle subassembly 26 has a notch 43 in the end of cross-member or arm 34. Notch 43 is sized to interact with a spur or rod 44 which projects from and runs substantially perpendicular to cross-member 36. Thus, the interaction of notch 43 with elongated rod 44 forms an open hinge arrangement. However, when locking bar 39 is in place, then the assembly is a substantially rigid cradle assembly. However, as can be discerned from FIG. 3, when subassemblies 24 and 26 are both in a flat position, then the whole cradle assembly may be readily slid from under the belt, for example, slid to the left as shown by arrow "A" so that the whole cradle assembly may be installed or removed without disturbing other permanent structures supporting the belt or without disturbing the belt or idler rollers.

The cradle assembly illustrated in FIGS. 1, 2, and 3 is a particularly useful construction inasmuch as the wing or outboard cradle subassemblies 24 and 26 not only fold to achieve a substantially flat, planar relationship with the central subassembly 24, but subasssemblies 24 and 26 swing away from subassembly 25 so that the bar-like members 27 are substantially remote from the conveyor belt and conveyor belt superstructure to facilitate maintenance to or replacement of said bar-like members.

An alternative structure to that illustrated in FIGS. 1, 2 and 3 is one in which the wing or outboard subassemblies are hinged at or near their interior edges so that the subassemblies may fold flat but do not swing away from the central subassembly. This may be accomplished by hinging the cross-members 34 to post 44 and having strut 28 notched on one or both ends so that strut 28 may be readily detached from either arm 34 or main beam 21 when it is desired to lower subassembly 26.

The manner of attaching impact bars 27 to cross-member 35 is illustrated in FIG. 4, which is an elevational end view. Bar 27 is composed of a top surface layer 45 of a very tough, smooth-surfaced, low friction material such as teflon, certain polyurethane compositions and other plastic materials. The core 46 of the bar is generally of a rubbery material. The rubber material is intended to be an impact absorber. The rubber core 46 is generally formed around an extruded metal member 47, such as an aluminum extrusion, which generally runs the length of the bar. The aluminum, or other metal extrusion 47, forms the primary structural support member of the impact bar 27. Also, the aluminum extrusion 47 has a "T"-shaped open channel which forms or acts as a receptacle for the head of a bolt 49 which may be slid into the channel, passed through a bolt hole 50 in cross-member 35 and then, with nut 51 tightened in place, holds the impact bar in position. Bolt 49 generally has a square head so that the bolt is held motionless while nut 51 is tightened or removed from the bolt.

Figure 5:
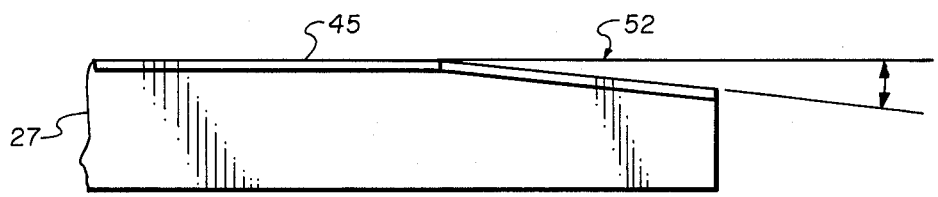
FIG. 5 is an elevational, side view of one end of a bar support illustrating a tapered bar surface.

An elevational side view of impact bar 27 is illustrated in FIG. 5 showing one end of the bar having a tapered upper surface 52. This tapered upper surface is generally oriented such that the belt passes over the bar in a direction of right to left so that any seams or joints etc. in the belt do not catch on the end of the bar as the belt passes over the top of the bar.

Figure 6:
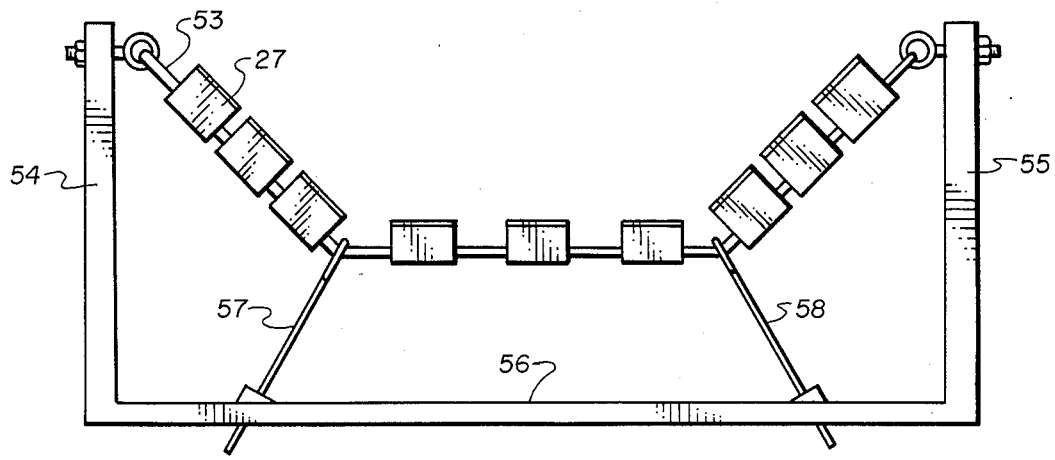
FIG. 6 is an elevational end view of a cable-supported cradle assembly for supporting a troughed conveyor belt.

Another support system for trough conveyor belts is illustrated in FIG. 6 wherein the impact bars 27 are supported on a cable 53. The terminal ends of the cable are attached to posts 54 and 55 which are attached to the ends of beam member 56. Eye bolts 57 and 58 are positioned to interact with the cable to form the cable bar assembly into a generally trough-like shape.

Figure 7:
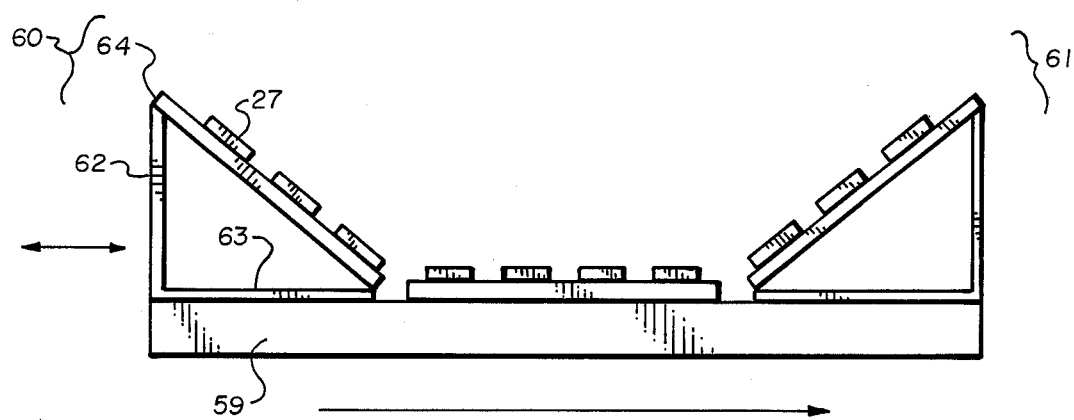
FIG. 7 is an elevational, end view of a cradle assembly with a transverse readily removable wing subassembly having a fixed, inclined surface.

In FIG. 7 another cradle assembly is illustrated for use with troughed belt conveyors whereby the cradle assembly may be retrofit into an existing conveyor belt installation. A transverse beam 59 forms one support member for the system. A subassembly 60 and another subassembly 61 are made to form wing members to support the conveyor belt. Cradle subassembly 60 is formed of rigid support members 62 and 63 with a cross-member 64 supporting bars 27. Member 63 is designed to be replaceably attached to transverse beam 59 such that the whole subassembly 60 may be slid in and out of position whenever bars need to be replaced. Thus, by having subassembly 60 removable from beam 59, then the whole remaining cradle assembly, which includes subassembly 61 and the bar 59, may be slid or removed to the right so that they may be removed from an existing trough belt conveyor without disturbing any of the super structure or the belt.

Figure 8:
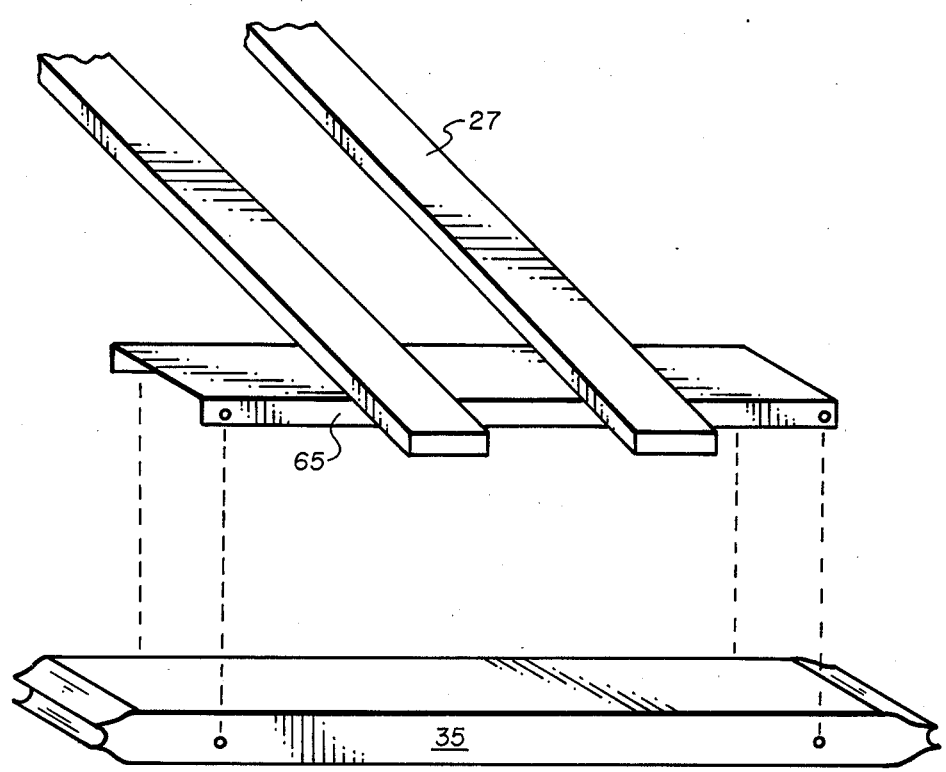
FIG. 8 is an exploded view of a bar support unit having a plurality of support bars attached to a channel member which is removably attached to a supporting cross-member of a cradle assembly of the type illustrated in FIG. 1.
Figure 9:
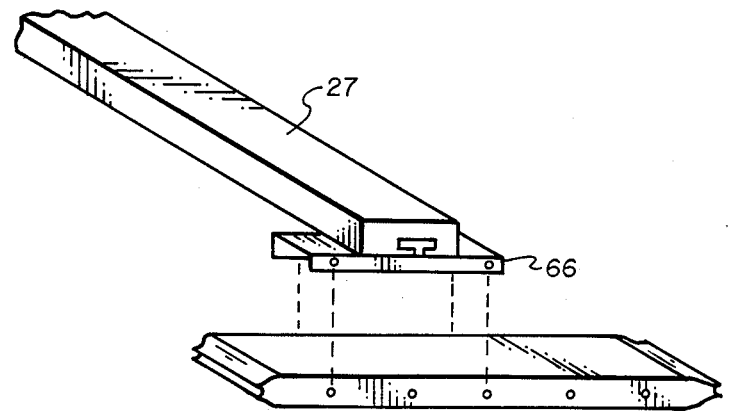
FIG. 9 is an exploded view of a single bar support member attached to a channel member adapted to interact in the same manner as the unit illustrated in FIG. 8.

FIGS. 8 and 9 illustrate additional sub-units for use in a cradle assembly to support a troughed conveyor belt or to support any other configuration of the belt.

In FIG. 8, a channel member 65 has attached to it two or more bar-like members 27. The bar members may be attached to the channel members so that there is no substantial protrusion which exists down into the open area between vertical walls of the channel member. The channel member is adapted to fit over cross-member, 35. In this embodiment, a plurality of impact bars may be attached to a channel member. When it is time to replace the impact bars on a subassembly, the channel member may be attached by bolts, pins or other means to the cross-member so that the whole unit (channel member and bars) may be removed from the cross-member. By having a plurality of impact bars attached to a channel member, such as channel member 65, then the channel and bars may be slid outwardly, see FIG. 3, i.e. transversely to the belt, so that each bar need not be removed completely longitudinally from the subassembly. In this fashion, even the bars attached to central cross-member 36 (FIG. 3) could be moved laterally or transversely to the belt without removing any further portion of the cradle or assembly.

FIG. 9 illustrates a sub-unit similar to FIG. 8 except that each impact bar 27 is fitted with an individual channel member 66 so that each individual bar may be replaced, but again replaced by sliding the bar transversely to the direction of travel of the conveyor belt.

I claim:

1. An outboard subassembly of bar-like support members adapted to interact with a main support member to form a cradle for a conveyor belt, said outboard subassembly comprising:
    at least a pair of spaced, substantially parallel cross-members;
    hinging means mechanically associating said cross-members to said main support member for allowing said outboard subassembly to swing away from, or alternatively, to be placed at an inclined angle relative to, said main support member, said hinging means including a pair of mutually parallel, rotational axis; and
    a plurality of spaced bar-like conveyor belt support members attached to said cross-members, said bar-like members positioned substantially perpendicularly to said cross-members.

2. A conveyor belt cradle assembly for use in supporting a conveyor belt above a mounting surface, said conveyor belt having a direction of travel, said cradle assembly comprising:
    a main support member having a central raised platform, said platform having a first side and an oppositely positioned second side;
    a plurality of first impact bars removable and replaceably mounted on said platform, said first impact bars defining a first planar support surface for receiving and supporting a conveyor belt;
    a first cross-member pivotedly and detachably mounted on said first side;
    a plurality of second impact bars removably and replaceably mounted on said first cross-member, said second impact bars defining a second planar support surface for receiving and supporting said conveyor belt;
    a first brace member, having a first proximal end pivotedly mounted to said main support member and a first distal end pivotedly mounted to said first cross-member, said cross-member being made rotatable about said pivot mounting of said first proximal end upon said first cross-member being detached from its mounting on said first side of said main support member;
    a second cross-member pivotedly and detachably mounted on said second side, an association of said main support member and said two cross-members defining a collapsible "U" shaped assembly;
    a plurality of third impact bars removably and replaceably mounted on said second cross-member, said third impact bars defining a third planar support surface for receiving and supporting said conveyor belt;
    a second brace member having a second proximal end pivotedly mounted to said main support member and a second distal end pivotedly mounted to said second cross-member, said second cross-member being made rotatable about said pivot mounting of said second proximal end upon said second cross-member being detached from its mounting on said second side of said main support member;
    a plurality of upright extension members, one extension member being mounted on said main support member proximate each pivot mounting of each said first and second brace members on said main support member;
    a plurality of locking shafts, each locking shaft being retractably positioned between a respective said upright extension member and its respective proximate brace member whereby said locking shaft releasably retains said respective brace member in an upright orientation by a wedging action between said upright extension member and said brace member;
    whereafter a detachment of said first cross-member from its mounting on said first side, said first cross-member may rotate about said first proximal end pivot mounting of said first brace member to a position wherein said second planar support surface is co-planar with said first planar support surface;
    wherein upon a detachment of said second cross-member from its mounting on said second side, said second cross-member may rotate about said second proximal end pivot mounting of said second brace member to a position wherein said third planar support surface is co-planar with said first planar support surface; and
    wherein said main support member is adapted to be slidably displaced over said mounting surface, transversely of a direction of travel of said conveyor belt whereby upon said second planar support surface of said third planar support surface being oriented co-planar with said first planar support surface, said cradle assembly may be slidingly removed, transversely, sufficiently away from said conveyor belt to facilitate access to said cradle assembly for replacing said impact bars without disturbing said conveyor belt.

3. A cradle assembly for supporting a troughed conveyor belt comprising:
    at least two linear main support beams having a length approximating the width of said conveyor belt said linear support beams being substantially parallel and spaced from one another;
    a pair of outwardly extending spurs mounted on each main support beam;

a pair cross-members (linear arms) indirectly attached to each main support beam and substantially aligned therewith, said cross-members having a length generally less than about one-half the length of said main support beam; each said cross-member having an interior end which defines a notch therein;

a strut member having length generally less than the length of said cross-member, a strut member being pinned to each cross-member intermediate the end thereof and pinned to said main support beam intermediate its midpoint and an outboard end of said cross-member;

a plurality of bar-like, belt support members attached substantially perpendicularly to said pair of spaced cross-members;

locking means to lock said strut members in a substantially upright position such that a said notch of each interior end of each cross-member engages a respective spur of said support beam to limit movement of said respective cross-member, each cross-member being held in an inclined position such that its outboard end is elevated with respect to its interior end.

4. A cradle assembly for supporting a troughed conveyor belt comprising:

at least two linear main support beams having a length approximately the width of said conveyor belt, said linear support beams being substantially parallel and spaced from one another;

a pair of cross-members (linear arms), each cross-member being indirectly attached to a mounting member on each said main support beam and being substantially aligned therewith, said cross-members having length generally less than about one-half the length of said main support beam;

a strut member having a length generally less than the length of said cross-member, a strut member being pinned to each cross-member intermediate the end thereof and pinned to said main support beam intermediate its midpoint and an outboard end of said cross-member;

a plurality of bar-like, belt support members attached substantially perpendicularly to said pair of spaced cross-members;

locking means to lock said strut members in a substantially upright position such that an interior end of each cross-member engages a respective mounting member to limit movement of said cross-member, each said cross-member being held in an inclined position such that its outboard end is elevated with respect to its interior end, said locking means having a locking rod outboard of and engaging a strut member and a riser member attached firmly to one of said support beams, said riser member trapping said locking bar in place.

5. A cradle assembly for supporting a troughed conveyor belt above a mounting surface, said cradle assembly comprising:

at least two linear main support beams, each support beam having a length approximating the width of said conveyor belt, said linear support beams being positioned substantially parallel and spaced apart from one another;

a pair of outwardly extending spurs mounted on each main support beam;

two cross-members (linear arms) indirectly attached to each main support beam and substantially aligned therewith, each said cross-member having an outboard end, an inboard end and a length generally less than about one-half the length of said main support beam, each said inboard end defining a notch therein;

a plurality of strut members, each said strut member having a proximal end, a distal end, and a length generally less than the length of said cross-member, each said strut member being pivotally mounted to a respective cross-member proximate said proximal end by a first pivot pin, said strut member being further pivotally mounted to said main support beam proximate said distal end by a second pivot pin, each said strut member being thereby hingingly associated with said main support beam and with said cross-member by means of said two pivot pins;

a plurality of first bar-like support members attached substantially perpendicular to a pair of longitudinally spaced cross-members, said first support member defining a first planar surface;

a plurality of second bar-like, belt support members attached to said main support beams to form a horizontally oriented second planar surface;

locking means mechanically associated with said strut members for locking said strut members in a substantially upright position such that said notch of each inboard end of each cross-member engages a respective spur of said support beam to limit movement of said respective cross-member, each cross-member being held in an inclined position with its outboard end elevated with respect to its inboard end;

wherein each said cross-member and its respective said strut member are rotatable about their respective said pivot pins to an orientation wherein said first planar surface is rendered co-planar with said second planar surface;

whereby said cradle assembly may be displaced over said mounting surface transversely of a direction of travel of said conveyor belt to permit access to said support members for purposes of servicing without disturbing said conveyor belt.

6. A cradle assembly for supporting a troughed conveyor belt above a mounting surface, said cradle assembly comprising:

at least two linear main support beams, each support beam having a length approximating the width of said conveyor belt, said linear support beams being positioned substantially parallel and spaced apart from one another;

two cross-members (linear arms) indirectly attached to each main support beam and substantially aligned therewith, each said cross-member having an outboard end, an inboard end and a length generally less than about one-half the length of said main support beam;

a plurality of strut members, each said strut member having a proximal end, a distal end, and a length generally less than the length of said cross-member, each said strut member being pivotally mounted to a respective cross-member proximate said proximal end by a first visit pin, said strut member being further pivotally mounted to said main support beam proximate said distal end by a second pivot pin, each said strut member being thereby hingingly associated with said main support beam add with said cross-member by means of said two pivot pins;

a plurality of first bar-like belt support members attached substantially perpendicular to a pair of longitudinally spaced cross-members, said first support members defining a first planar surface;

a plurality of second bar-like, belt support members attached to said main support beams to form a horizontally oriented second planar surface;

locking means mechanically associated with said strut members for locking said strut members in a substantially upright position, such that an interior end of each cross-member engages a respective mounting member mounted on said main support beam to limit movement of said cross-member, each cross-member being held in an inclined position with its outboard end elevated with respect to its interior end, said locking means including a locking rod positioned outboard of and engaging a strut member and a riser member attached firmly to one of said support beams, said riser member retaining said locking bar in place;

wherein each said cross-member and its respective said strut member are rotatable about their respective said pivot pins to an orientation wherein said first planar surface is co-planar with said second planar surface;

whereby said cradle assembly may be displaced over said mounting surface transversely of a direction of travel of said conveyor belt to permit access to said support members for purposes of servicing without disturbing said conveyor belt.

* * * * *